(12) United States Patent
Hu et al.

(10) Patent No.: US 10,487,722 B2
(45) Date of Patent: Nov. 26, 2019

(54) COMPRESSOR HOUSING

(71) Applicant: Ford Global Technologies, LLC, Dearborn, MI (US)

(72) Inventors: Liangjun Hu, Bloomfield Hills, MI (US); David Curtis Ives, Ann Arbor, MI (US); Eric Warren Curtis, Milan, MI (US); Jianwen James Yi, West Bloomfiled, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 15/829,765

(22) Filed: Dec. 1, 2017

(65) Prior Publication Data

US 2019/0170056 A1    Jun. 6, 2019

(51) Int. Cl.
| | |
|---|---|
| *F02B 29/04* | (2006.01) |
| *F04D 29/58* | (2006.01) |
| *F04D 29/42* | (2006.01) |
| *F02M 26/05* | (2016.01) |
| *F01D 25/12* | (2006.01) |
| *F01D 25/14* | (2006.01) |
| *F02B 37/00* | (2006.01) |

(52) U.S. Cl.
CPC ........ *F02B 29/0443* (2013.01); *F01D 25/125* (2013.01); *F01D 25/14* (2013.01); *F02B 37/00* (2013.01); *F02M 26/05* (2016.02); *F04D 29/4206* (2013.01); *F04D 29/584* (2013.01); *F04D 29/5826* (2013.01); *F05D 2220/40* (2013.01); *F05D 2260/607* (2013.01)

(58) Field of Classification Search
CPC .... F01D 25/125; F01D 25/14; F02B 29/0443; F02B 37/00; F02M 26/05; F04D 27/009
See application file for complete search history.

(56) References Cited

U.S. PATENT DOCUMENTS

| | | | |
|---|---|---|---|
| 7,010,916 B2 * | 3/2006 | Sumser | ................... F01D 11/02 415/114 |
| 8,061,974 B2 | 11/2011 | Gu et al. | |
| 8,517,664 B2 | 8/2013 | Sun et al. | |
| 2011/0180026 A1 | 7/2011 | Heusler | |
| 2016/0273548 A1 * | 9/2016 | Uesugi | ................ F04D 29/4206 |

FOREIGN PATENT DOCUMENTS

| | | | | |
|---|---|---|---|---|
| CN | 202707158 U | 1/2013 | | |
| DE | 102007023142 A1 * | 11/2008 | ............. | F01D 25/08 |
| DE | 102010030516 A1 * | 12/2011 | ............. | F01D 25/14 |
| DE | 102010042104 A1 * | 4/2012 | ............. | F01D 25/14 |
| GB | 777582 | 6/1957 | | |
| JP | 2003035153 A | 2/2003 | | |
| WO | WO-2012079664 A1 * | 6/2012 | ............. | F01D 25/14 |

* cited by examiner

*Primary Examiner* — Jesse S Bogue
(74) *Attorney, Agent, or Firm* — Geoffrey Brumbaugh; McCoy Russell LLP

(57) ABSTRACT

A turbocharger compressor and method are provided including a first coolant passage in thermal contact with an inlet configured to direct the charge gas toward an impeller; and second, third, and fourth coolant passages respectively in thermal contact with impeller, volute, and diffuser regions. All of the coolant passages are fluidically coupled with a heat exchanger. One or more of the coolant passages are configured such that coolant flows in an upstream direction relative to a general flow direction of charge gas through the compressor.

20 Claims, 4 Drawing Sheets

COMPRESSOR HOUSING

FIELD

The present application relates to systems for turbochargers of internal combustion engines with exhaust gas recirculation.

BACKGROUND AND SUMMARY

Engines may use a turbocharger to improve engine torque/power output density. In one example, a turbocharger may include a compressor and a turbine connected by a drive shaft, where the turbine is coupled to the exhaust manifold side and the compressor is coupled to the intake manifold side. In this way, the exhaust-driven turbine supplies energy to the compressor to increase the flow of air into the engine.

Attempts to achieve high efficiency and wide flow range turbocharger compressor for improved engine power and fuel economy, especially for diesel engines, may include variable inlet compressor and variable vaned diffuser. However, those technologies may require actuation systems, which may increases costs and durability concerns. In addition, increased turbocharged engine power density may produce high pressure ratios and high temperature inside the compressor. High temperature provides various shortcomings including oil coking inside the compressor diffuser. This may cause a drop in compressor efficiency.

The compressor may be intended to work in an operating range between two conditions, surge and choke. Surge occurs during low air mass flow, when the air flow through the compressor stalls and may reverse. The reversal of air flow may cause the engine to lose power. One source of surge, tip-out surge, may occur when the engine suddenly decelerates. During tip-out surge, the engine and the air flow mass through the compressor may slow down, while the turbocharger continues to spin due to inertia and delays through the exhaust system. The spinning compressor and low air flow rate may cause rapid pressure build-up on the compressor outlet, while the lagging higher exhaust flow rate may cause pressure reduction on the turbine side. When forward flow through the compressor can no longer be sustainable, a momentary flow reversal occurs, and the compressor is in surge.

One solution to cool the turbine side of the turbocharger, which is subjected to very hot exhaust gasses, is disclosed in US 2011/0180026A1. A cooling jacket is provided in the wall of the turbine housing to allows fluid cooling. However, the inventors herein have recognized the compressor side of the turbocharger would benefit from more efficient cooling, for at least the reasons discussed herein.

In particular, in accordance with the present disclosure a turbocharger compressor to address the above issues is described. The turbocharger compressor may include an inlet configured to intake a charge gas at a first end and to direct the charge gas toward an impeller. A first coolant passage may be in thermally conductive contact with the charge gas in the inlet and fluidically coupled with a heat exchanger. An impeller region may surround the impeller downstream from the inlet, and a second coolant passage may be in thermally conductive contact with the impeller region and fluidically coupled with the heat exchanger. A diffuser region may be downstream from the impeller region, and a third coolant passage may be in thermally conductive contact with the diffuser region and fluidically coupled with the heat exchanger. In addition a volute region may be downstream from the diffuser region, and a fourth coolant passage may be in thermally conductive contact with the volute region and fluidically coupled with the heat exchanger. In this way, charge gases along the path through the compressor may experience particularly effective cooling. Also in this way, areas within the compressor that may have oil present may be less likely to experience oil coking. Also in this way a charge air cooler may be less burdened by particularly hot intake air.

Embodiments may also provide a turbocharger compressor wherein one or more coolant passages, for example the first or the second coolant passage may be configured such that coolant flows in an upstream direction relative to a general flow direction of charge gas through the compressor. In this way heat removal in the intake region may be particularly effective.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Finally, the above explanation does not admit any of the information or problems were well known.

DETAILED DESCRIPTION

Figure 1:
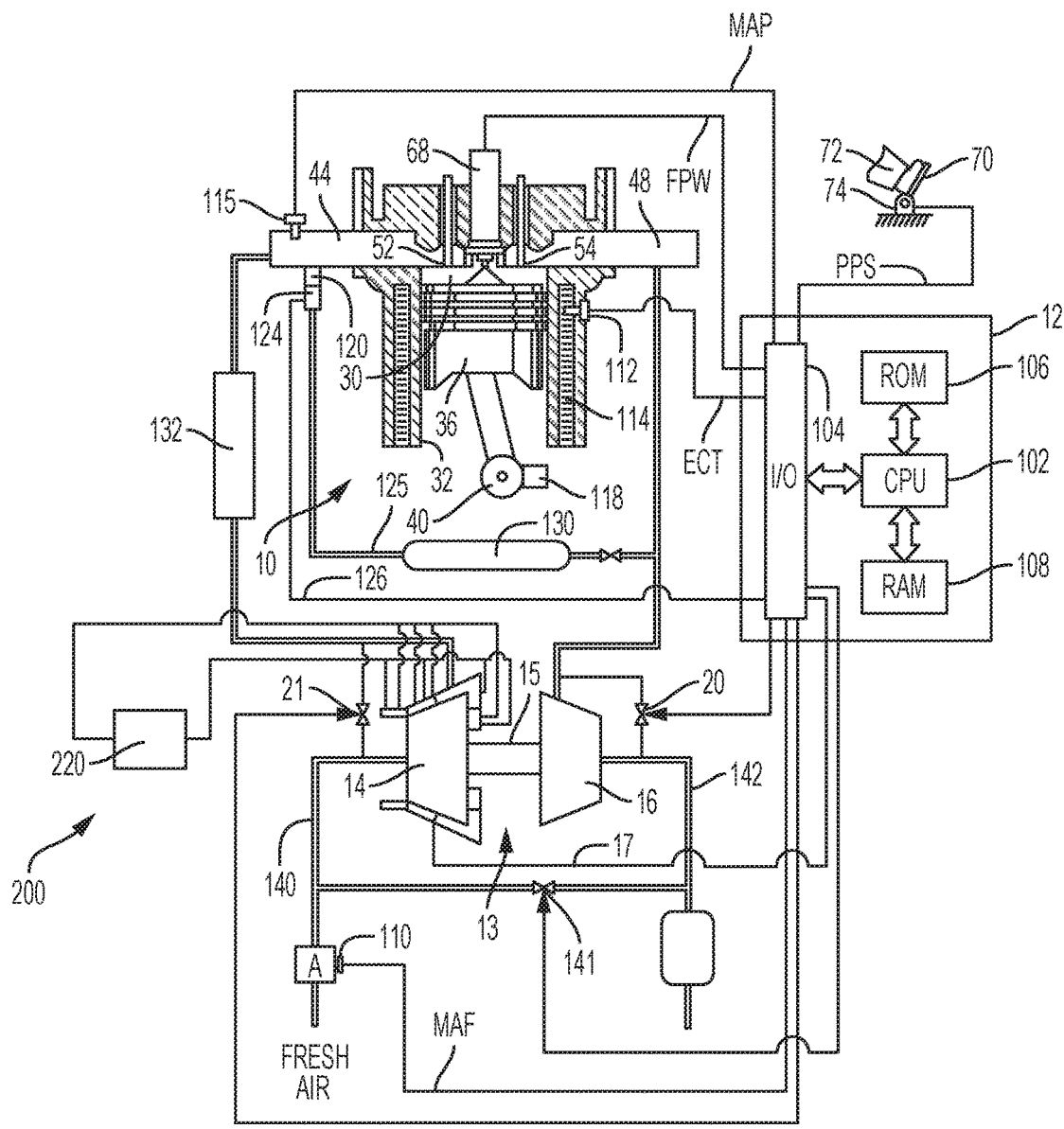
FIG. 1 shows a block diagram of a turbocharged engine with exhaust gas recirculation in accordance with the present disclosure.

FIG. 1 shows an example of a turbocharged engine with an EGR system. Specifically, internal combustion engine 10, comprising a plurality of cylinders, one cylinder of which is shown in FIG. 1, is controlled by controller 12. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Intake manifold 44 is also shown having fuel injector 68 coupled thereto for delivering fuel in proportion to the pulse width of signal (FPW) from controller 12.

The engine may be coupled in a hybrid-electric vehicle that includes a motor/generator and battery system coupled with the engine so that the vehicle can be driven by the motor without engine operation under select conditions. The vehicle may be a plug-in electric hybrid vehicle and further may operate in various modes including all-electric as noted. The vehicle may also operate in an autonomous driving mode and the selection of the motor/engine mode may vary in autonomous driving conditions as compared to driver controlled operation. In some examples, control of the turbocharge valves, as described in detail below, may depend on the operating mode, including the autonomous mode.

Controller 12 is shown as a microcomputer, including microprocessor unit 102, input/output ports 104, an electronic storage medium for executable programs and calibration values shown as read only memory chip 106 in this particular example, random access memory 108, and a conventional data bus.

Controller 12 receives various signals from sensors coupled to engine 10, including but not limited to: measurements of inducted mass air flow (MAF) from mass air flow sensor 110 coupled to the air filter; engine coolant temperature (ECT) from temperature sensor 112 coupled to cooling sleeve 114; a measurement of manifold pressure (MAP) from manifold pressure sensor 115 coupled to intake manifold 44; and a profile ignition pick up signal (PIP) from Hall effect sensor 118 coupled to crankshaft 40 indicating an engine speed.

In a configuration known as high pressure EGR, exhaust gas is delivered to intake manifold 44 by EGR tube 125 communicating with exhaust manifold 48. EGR valve assembly 120 is located in EGR tube 125. Stated another way, exhaust gas travels from exhaust manifold 48 first through valve assembly 120, then to intake manifold 44. EGR valve assembly 120 can then be said to be located upstream of the intake manifold. There is also an optional EGR cooler 130 placed in EGR tube 125 to cool EGR before entering the intake manifold. Low pressure EGR may be used for recirculating exhaust gas from downstream of turbine 142 to upstream of compressor 140 via valve 141.

Pressure sensor 115 provides a measurement of manifold pressure (MAP) to controller 12. EGR valve assembly 120 has a valve position (not shown) for controlling a variable area restriction in EGR tube 125, which thereby controls EGR flow. EGR valve assembly 120 can either minimally restrict EGR flow through tube 125 or completely restrict EGR flow through tube 125, or operate to variably restrict EGR flow. Vacuum regulator 124 is coupled to EGR valve assembly 120. Vacuum regulator 124 receives actuation signal 126 from controller 12 for controlling valve position of EGR valve assembly 120. In one embodiment, EGR valve assembly is a vacuum actuated valve. However, any type of flow control valve may be used, such as, for example, an electrical solenoid powered valve or a stepper motor powered valve. The controller 12 thus receives signals from various sensors and employs various actuators, such as the turbocharger valves described herein, to adjust engine operation based on the received signals and instructions stored on a memory of the controller. Instructions for carrying out the example methods included herein may be executed by the controller based on instructions stored on a memory of the controller and in conjunction with signals received from sensors of the engine system, such as the sensors described above. The controller may employ actuators of the system to adjust engine operation, according to the methods described herein.

Turbocharger 13 has a turbine 16 coupled in the exhaust manifold 48 and a compressor 14 coupled in the intake manifold 44 via an intercooler 132. Turbine 16 is coupled to compressor 14 via drive shaft 15. Air at atmospheric pressure enters compressor 14 from passage 140. Exhaust from turbine 16 exits passage 142. Various turbocharger arrangements may be used. For example, a variable nozzle turbocharger (VNT) may be used when a variable area nozzle is placed upstream and/or downstream of the turbine in the exhaust line for varying the effective expansion of gasses through the turbine. Still other approaches may be used for varying expansion in the exhaust, such as a waste gate valve. FIG. 1 shows an example valve 20 acting as a waste gate. As noted above, the valve may be located within the turbine, or may be a variable nozzle. FIG. 1 also illustrates a cooling system 200 that may provide advantageous cooling to, or for, the turbocharger compressor 14 in accordance with the present disclosure.

Figure 2:
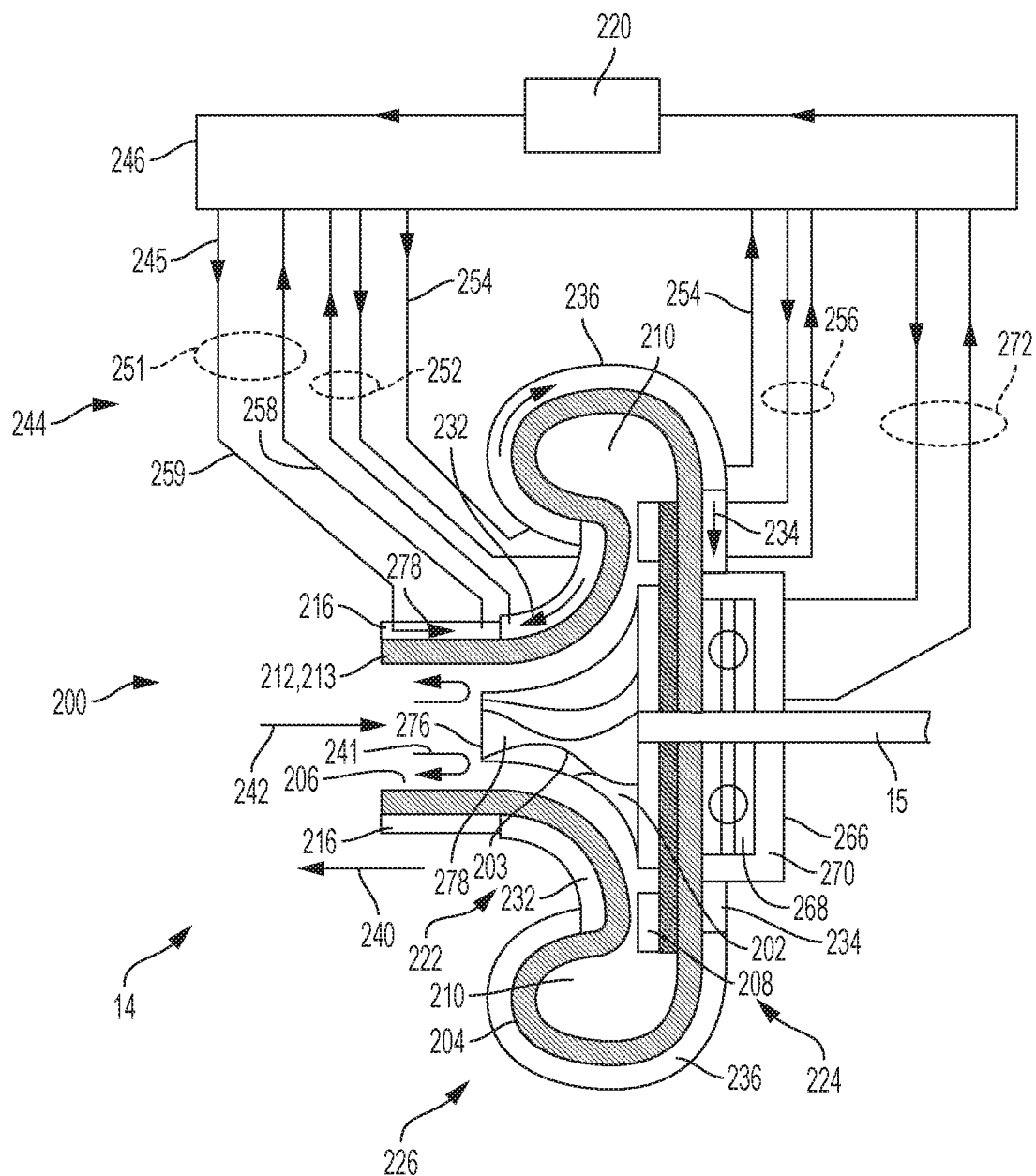
FIG. 2 is a cross-sectional depiction illustrating an example turbocharger compressor in accordance with the present disclosure.

Referring now to FIG. 2, which illustrates a cross-sectional depiction of an example turbocharger compressor 14 in accordance with the present disclosure, the compressor 14 may include impeller 202, diffuser 208, compressor chamber 210, and casing 204. The rotation of impeller 202, draws gas into compressor 14 through compressor inlet 206 of casing 220. As non-limiting examples, the gas may include air from passage 140 (FIG. 1), exhaust gas (such as when using long loop EGR), gaseous fuel (such as when using port injection of fuel), and combinations thereof. Gas flows from compressor inlet 206 and may be accelerated by impeller 202 through diffuser 208 into compressor chamber 210. Diffuser 208 and compressor chamber 210 may decelerate the gas causing an increase in pressure in compressor chamber 210. Gas under pressure may flow from compressor chamber 210 to intake manifold 44.

Elements in turbocharger 13 may be described relative to the direction of the gas flow path through turbocharger 13. An element substantially in the direction of gas flow relative to a reference point is downstream from the reference point. An element substantially opposite the direction of gas flow relative to a reference point is upstream from the reference point. For example, compressor inlet 206 is upstream from impeller 202 which is upstream from diffuser 208. Diffuser 208 is downstream from impeller 202 which is downstream from compressor inlet 206.

The compressor 14 may include an inlet 206 that may be configured to intake a charge gas at a first end 212 and to direct the charge gas toward an impeller 202. A first coolant passage 216 may be in thermally conductive contact with the charge gas in the inlet 206 and may be fluidically coupled with a heat exchanger 220. An impeller region 222 may surround the impeller 202 downstream from the inlet 206. A second coolant passage 232 may be in thermally conductive contact with the impeller region 222 and may be fluidically coupled with the heat exchanger 220. A diffuser region 224 may be downstream from the impeller region 222, and a third coolant passage 234 may be in thermally conductive contact with the diffuser region 224, and may be fluidically coupled with the heat exchanger 220. A volute region 226 may be downstream from the diffuser region 224. A fourth coolant passage 236 may be in thermally conductive contact with the volute region 226, and may be fluidically coupled with the heat exchanger 220.

Figure 3:
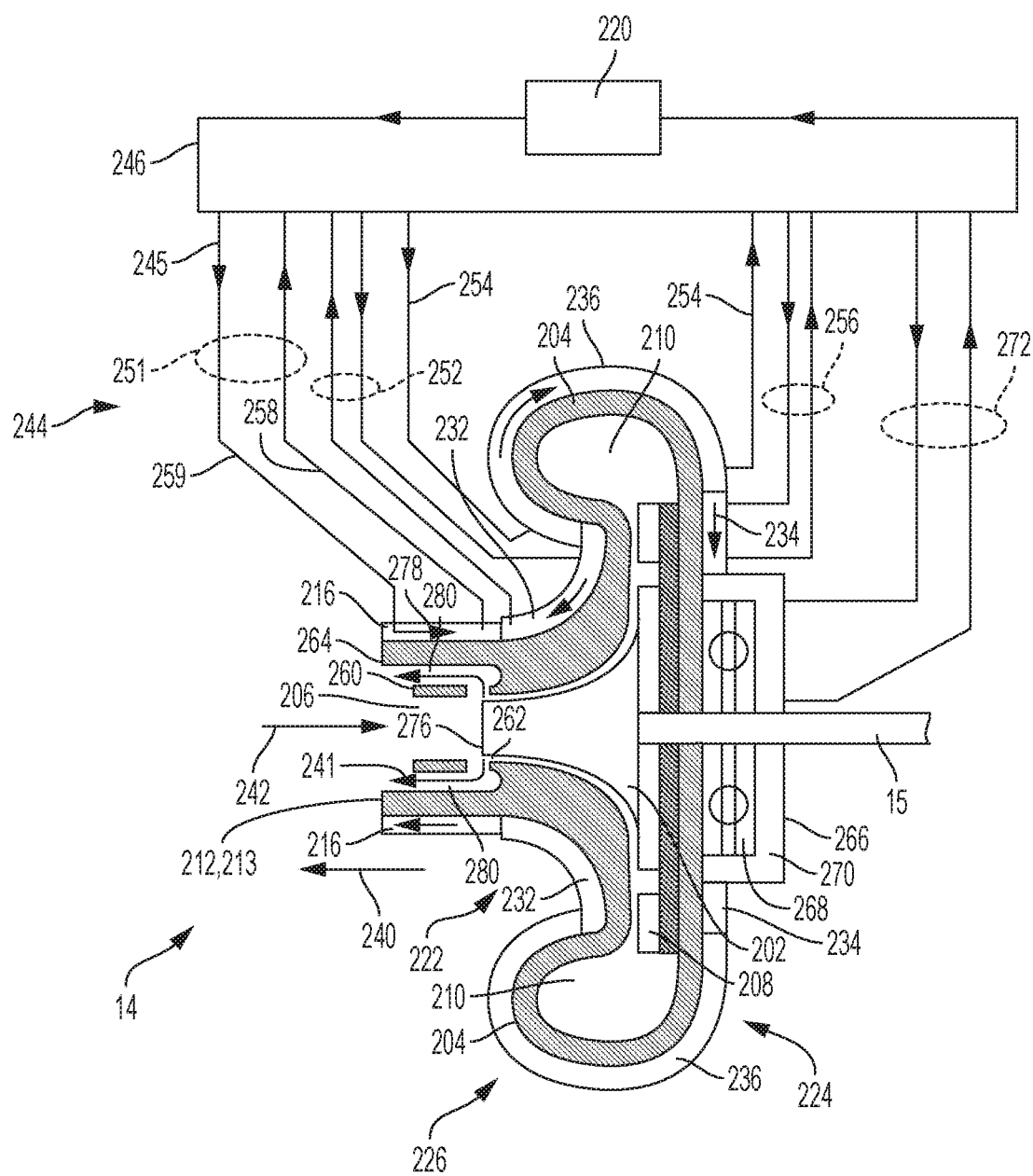
FIG. 3 is a cross-sectional depiction illustrating another example turbocharger compressor in accordance with the present disclosure.

FIGS. 2-3 also illustrate a number of example coolant paths 244 whereby a coolant fluid may be directed with appropriate piping, or tubing, or the like. Example flow directions are indicated with arrowheads 245. A main coolant loop 246 may pass a warmed coolant through the heat exchanger 220 wherein it may be cooled and directed to flow again to areas to be cooled. For example, coolant may be directed to pass through the coolant passages 216, 232, 234, 236, via individual coolant paths 244 including coolant loops 251, 252, 254, 256.

Some embodiments may provide a compressor 14 wherein the second coolant passage 232 is configured such that coolant may flow in an upstream direction 240 relative to a general flow direction 242 of charge gas through the compressor 14. In some cases the first coolant passage 216 may be configured such that coolant may flow in an upstream direction 240. Coolant may flow into the first coolant passage 216 from an incoming branch 258 of a first coolant loop 251 coupled at a downstream side of the first coolant passage 216. Coolant then may return to the main coolant loop 246 via an outgoing branch 259 of the first coolant loop 251.

A second coolant loop 252 may provide coolant to the second coolant passage 232, a third coolant loop 254 may provide coolant to the third coolant passage 234, and a fourth coolant loop 256 may provide coolant to the fourth coolant passage 236. However, as indicated in the illustrated example embodiment, coolant may flow through the second coolant passage 232, the third coolant passage 234, and the fourth coolant passage 236, via respective second, third, and fourth coolant loops 253, 254, 256 in an downstream direction. Other configurations are possible.

FIG. 3 is a cross-sectional depiction illustrating another example turbocharger compressor 14 in accordance with the present disclosure. The compressor 14 may have an inlet 206 that may include a ported shroud 260 wherein under particular conditions the charge gas may flow as indicated with arrow 241, through one or more ports 262 and between the shroud 260 and an inner wall 264 in an upstream direction 240 relative to a general flow of charge gas through the inlet, and wherein a coolant may flow through the first coolant passage in the upstream direction 240.

As illustrated in the example embodiments shown FIG. 2 and FIG. 3 one or more of the first second third and fourth coolant passages 216, 232, 234, 236 may be fluidically coupled with a water jacket 266 configured to cool a bearing element 268 configured to at least help support the impeller 202 for rotation. The water jacket 266 is depicted here simply as a bearing coolant passage 270 surrounding a schematic depiction of a bearing 268. It may be constructed in various ways including in contemporary and/or traditional ways. Coolant may be provided to the bearing coolant passage 270 via a bearing coolant loop 272.

Figure 4:
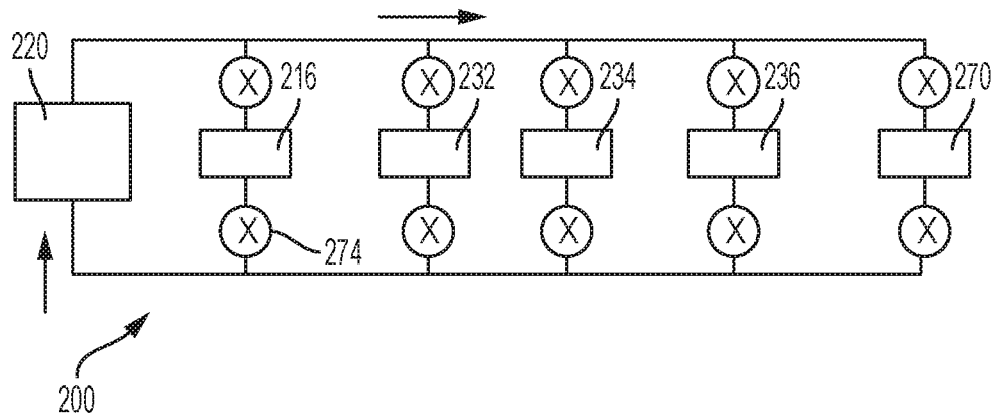
FIG. 4 illustrates an example first, second, third, and fourth coolant passages arranged in an example U-type manifold flow arrangement in accordance with the present disclosure.
Figure 5:
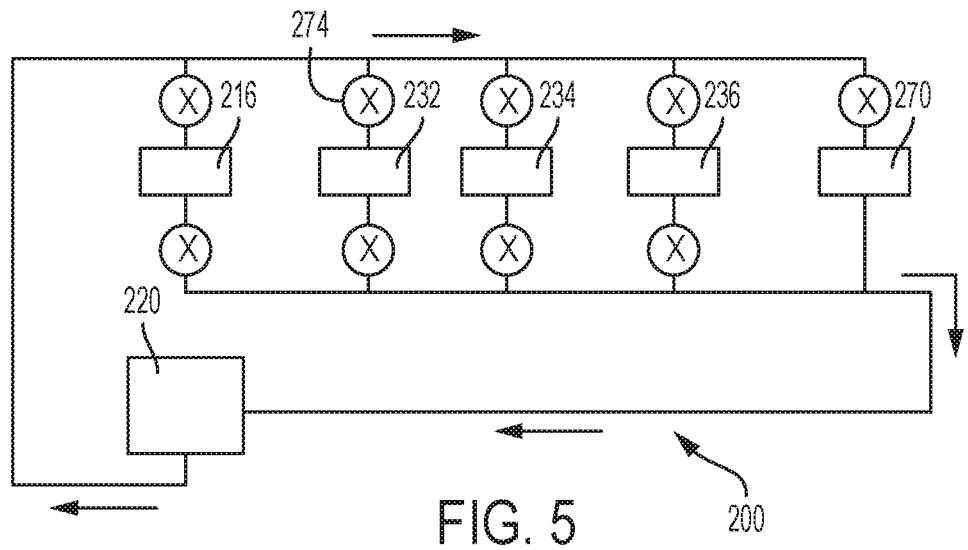
FIG. 5 illustrates an example first, second, third, and fourth coolant passages arranged in an example Z-type manifold flow arrangement in accordance with the present disclosure.
Figure 6:
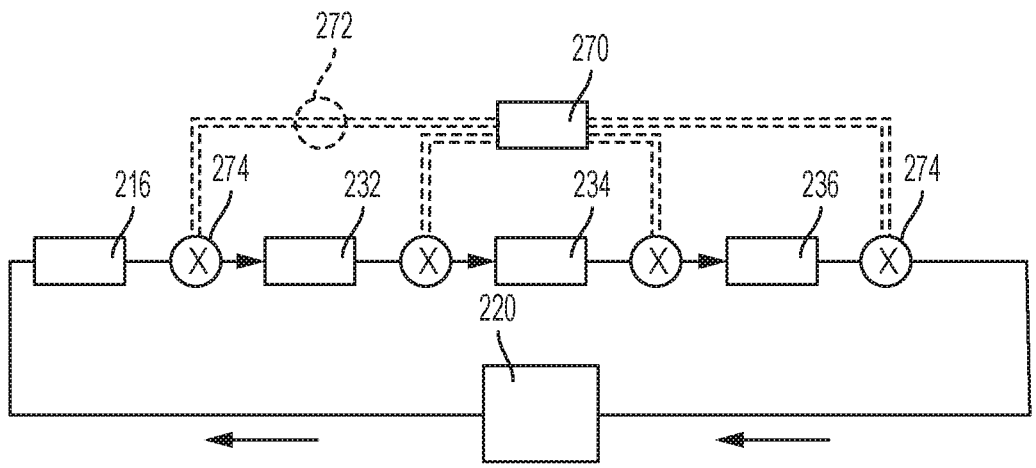
FIG. 6 illustrates an example first, second, third, and fourth coolant passages arranged in an example sequential flow arrangement in accordance with the present disclosure.

FIGS. 2-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example FIGS. 4-6 are schematic illustrations showing various coolant flow configurations. Coolant flow may pass through the various coolant passages 216, 232, 234, 236 in various orders and/or combinations. For example flow may be sequential flow (FIG. 6), or parallel flow (FIGS. 4-5) using, for example, one or more manifold arrangements. Manifolds may provide various types of flow, for example a dividing flow, or a combining flow. The order of the individual flow junctions may also define types of flow as, for example U-type flow, or manifold (FIG. 4), or Z-type flow, or manifold (FIG. 5).

The different example flow orders and combinations illustrated in the figures may be modified and/or combined in a mix and match fashion to yield other flow arrangements. For example, two or more coolant passages may be configured to have flow pass through them in sequential order while together they may receive fluid in parallel with one or more other passages. In addition, the bearing coolant passage may be combined in any of the possible arrangements in accordance with the disclosure. FIG. 6 illustrates possible variations with double rows of dashed lines indicating that the bearing coolant loop 272 may be coupled with the other coolant loops between various junctions of piping, for example. One or more valves 274 may be located between various components of the cooling system 200. The valves may be controlled by the controller 12. In this way, coolant flow may be selectively controlled through the cooling system 200 responsive to sensed engine operating parameters such as coolant temperature, intake air temperature, engine load, and/or other parameters and combinations thereof. The valves may be operatively coupled with the controller 12.

In some embodiments the two or more coolant passages 216, 232, 234, 236 may be made integral with one another. For example, without limitation, the second, third and fourth coolant passages 232, 234, 236 may be combined to various levels of integration, including fully integrated, and the first coolant passage may be separate. Other combinations may be used.

Various embodiments provide a turbocharger compressor 14 wherein the first second third and fourth coolant passages 216, 232, 234, 236 are coupled with the heat exchanger 220 to receive a substantially parallel flow of coolant. In other cases one or more of the coolant passages 216, 232, 234, 236 may be upstream, or downstream of the bearing coolant passage 270 and may receive a sequential coolant flow before or after the bearing coolant passage 270. In some embodiments more than one heat exchanger may be used. Various embodiments provide a turbocharger compressor 14 wherein two or more coolant passages 216, 232, 234, 236 receive flow of coolant sequentially first through one of the two or more coolant passages and then through the other.

Various embodiments provide compressor housing 204, or casing 204 for compressing charge air for an internal combustion engine 10. The compressor housing 204 may include an inlet region 206 having an opening 274 at an upstream side 213, and having a downstream side 276 at an inducer area 276 of an impeller blade 203. An impeller region 222 may surround the impeller blade 203 downstream from the inlet region 206. A diffuser region 224 may be downstream from the impeller region 206. A volute region 226 downstream from the diffuser region 224. A coolant passage 216 in the inlet region 206 may be in thermally conductive contact with the charge air within the inlet region 206 wherein a coolant fluid flows in an upstream direction 240 relative to a general flow direction 242 of the charge air, as an upstream directed coolant flow 278.

In some cases, for example, under surge, or near surge conditions (which may be sensed based on engine airflow and/or other parameters), charge air may tends to flow adjacent an inner surface of the inlet region in the upstream direction 240 as a recirculated flow 241. The coolant fluid flow in the upstream direction, for example, the upstream directed coolant flow 279, may absorb heat from the recirculated flow. In this way heat absorption may be particularly effective. Also in this way, areas downstream from the inlet, for example the diffuser region 224 may tend to experience cooler conditions which may tend to reduce chances of oil coking.

Referring in particular to FIG. 3, the compressor 14 may include a shroud 260 in the inlet region 206 which may be spaced from an inner surface, or inner wall 264 of the inlet region 206 defining a channel 280 therebetween. Openings, or ports 262 may be provided through the shroud 260 wherein fluid, at least under some operating conditions of the compressor 14, may flow through the openings 262 and through the channel 278 in the upstream direction 240 as a recirculated flow 241, and wherein the coolant fluid flow in the upstream direction 240 may absorb heat from the recirculated flow 241. The compressor 14 may include a second coolant passage 232 in thermally conductive contact with the impeller region 222, a third coolant passage 234 in thermally conductive contact with the diffuser region 224, and a fourth coolant passage 236 in thermally conductive contact with the volute region 226.

In some embodiments, the compressor 14 may include a bearing housing to house a bearing 268 to support the impeller 202 for rotation. A water jacket, for example a bearing coolant passage 270, may be included to house a coolant in thermally conductive contact with the bearing 268. The coolant passage 270 may be fluidically coupled with the water jacket.

At least the second third and fourth coolant passages 232, 234, 236 may be fluidically coupled such that the coolant fluid flows sequentially from the second to the third then to the fourth coolant passage. I some cases at least the second third and fourth coolant passages are each fluidically coupled to a coolant path 244 such that the coolant fluid flows in substantially parallel paths to each of the second third and fourth coolant channels. Each of the first second third and fourth coolant passages may each be fluidically coupled to a coolant line 246 such that the coolant fluid may flow in substantially parallel paths to each of the first second third and fourth coolant passages 232, 234, 236.

Various embodiments may provide a method for use with a compressor used to compress charge air for an engine, the method may include passing a coolant through a first passage in thermal contact with an inlet passage interior surface in an upstream direction relative to a general flow direction of the charge air; absorbing heat from at least a recirculating portion of charge air flow; and moving the absorbed heat away from the inlet passage via the coolant to a heat exchanger.

The method may also include passing the coolant through a second passage in thermal contact with an impeller region of the compressor, absorbing heat from the impeller region, and moving the absorbed heat via the coolant to the heat exchanger. The method may also include passing a coolant through a third passage in thermal contact with an diffuser region of the compressor, absorbing heat from the diffuser region, and moving the absorbed heat via the coolant to the heat exchanger. The method may also include passing a coolant through a fourth passage in thermal contact with an volute region of the compressor, absorbing heat from the volute region, and moving the absorbed heat via the coolant to the heat exchanger.

In some embodiments the method may also include: passing the coolant through a second passage in thermal contact with an impeller region of the compressor, absorbing heat from the impeller region; passing the coolant through a third passage in thermal contact with an diffuser region of the compressor, absorbing heat from the diffuser region; passing the coolant through a fourth passage in thermal contact with a volute region of the compressor, absorbing heat from the volute region; and moving the absorbed heat via the coolant to the heat exchanger.

In some cases the passing the coolant through the first passage in thermal contact with the inlet passage interior surface may include directing the coolant fluid from a cooling fluid conduit coupled with a coolant jacket configured to cool a bearing. The bearing may be configured for supporting a shaft disposed for rotation with a turbine positioned within the compressor.

In the example where the vehicle is an autonomous hybrid electric vehicle, the methods may include adjusting one or more valves of the turbocharger to a first position (e.g., fully open, fully closed, or partially open near open) while operating in an autonomous driving mode including no passengers in the vehicle and the engine operating, and in one example in response to the autonomous driving mode being in operation, and adjusting the one or more valves to a second position (e.g., fully closed, fully open, or partially open near closed), different than the first position, while operating in a non-autonomous mode and in one example in response to the non-autonomous driving mode being in operation (such as a driver actively driving the vehicle with the engine operating).

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A turbocharger compressor comprising:
an inlet configured to intake a charge gas at a first end and to direct the charge gas toward an impeller, a first coolant passage in thermally conductive contact with the charge gas in the inlet and fluidically coupled with a heat exchanger;
an impeller region surrounding the impeller downstream from the inlet, a second coolant passage in thermally conductive contact with the impeller region and fluidically coupled with the heat exchanger;
a diffuser region downstream from the impeller region, a third coolant passage in thermally conductive contact with the diffuser region and fluidically coupled with the heat exchanger; and
a volute region downstream from the diffuser region, a fourth coolant passage in thermally conductive contact with the volute region and fluidically coupled with the heat exchanger.

2. The turbocharger compressor of claim 1, wherein one or more of the first and second coolant passages are configured such that coolant flows in an upstream direction relative to a general flow direction of charge gas through the compressor.

3. The turbocharger compressor of claim 1, wherein the inlet includes a ported shroud wherein under particular conditions the charge gas flows through one or more ports and between the shroud and an inlet wall in an upstream direction relative to a general flow of charge gas through the inlet, and wherein a coolant flows through the first coolant passage in the upstream direction.

4. The turbocharger compressor of claim 1, wherein one or more of the first second third and fourth coolant passages are fluidically coupled with a water jacket configured to cool a bearing element configured to support the impeller for rotation.

5. The turbocharger compressor of claim 1, wherein the first second third and fourth coolant passages are coupled with the heat exchanger to receive a substantially parallel flow of coolant.

6. The turbocharger compressor of claim 1, wherein two or more coolant passages receive flow of coolant sequentially first through one of the two or more coolant passages and then through the other.

7. A compressor housing for compressing charge air for an internal combustion engine comprising:
an inlet region having an opening at an upstream side and having a downstream side at an inducer area of an impeller blade;
an impeller region surrounding the impeller blade downstream from the inlet region;
a diffuser region downstream from the impeller region;
a volute region downstream from the diffuser region;
a coolant passage in the inlet region in thermally conductive contact with the charge air within the inlet region wherein a coolant fluid flows in an upstream direction relative to a general flow direction of the charge air.

8. The compressor of claim 7, wherein under surge, or near surge, conditions charge air tends to flow adjacent an inner surface of the inlet region in the upstream direction as a recirculated flow, and wherein the coolant fluid flow in the upstream direction absorbs heat from the recirculated flow.

9. The compressor of claim 7, further comprising: a shroud in the inlet region spaced from an inner surface of the inlet region defining a channel therebetween, openings through the shroud, and wherein fluid, at least under some operating conditions of the compressor flows through the openings and through the channel in the upstream direction as a recirculated flow, and wherein the coolant fluid flow in the upstream direction absorbs heat from the recirculated flow.

10. The compressor of claim 7, further comprising:
a second coolant passage in thermally conductive contact with the impeller region;
a third coolant passage in thermally conductive contact with the diffuser region; and
a fourth coolant passage in thermally conductive contact with the volute region.

11. The compressor of claim 7, further comprising a bearing housing to house a bearing to support the impeller for rotation, and a water jacket to house a coolant in thermally conductive contact with the bearing, and wherein the coolant passage is fluidically coupled with the water jacket.

12. The compressor of claim 7, wherein at least the second third and fourth coolant passages are fluidically coupled such that the coolant fluid flows sequentially from the second to the third then to the fourth coolant passage.

13. The compressor of claim 7, wherein at least the second third and fourth coolant passages are each fluidically coupled to a coolant line such that the coolant fluid flows in substantially parallel paths to each of the second third and fourth coolant passages.

14. The compressor of claim 7, wherein each of the first second third and fourth coolant passages are each fluidically coupled to a coolant line such that the coolant fluid flows in substantially parallel paths to each of the first second third and fourth coolant passages.

15. A method of cooling a compressor for an engine in a hybrid, comprising: passing a coolant through a first passage, in thermal contact with a compressor inlet passage interior surface, in an upstream direction relative to a general flow direction of charge air; absorbing heat from at least a recirculating portion of charge air flow; and moving the absorbed heat away from the inlet passage via the coolant to a heat exchanger.

16. The method of claim 15, further comprising passing the coolant through a second passage in thermal contact with an impeller region of the compressor, absorbing heat from the impeller region, and moving the absorbed heat via the coolant to the heat exchanger, wherein the vehicle is an autonomous vehicle and where one or more valves of the turbocharger are adjusted to a first position while operating in an autonomous driving mode including no passengers in the vehicle, and the one or more valves are adjusted to a second position while operating in a non-autonomous mode.

17. The method of claim 15, further comprising passing a coolant through a third passage in thermal contact with an diffuser region of the compressor, absorbing heat from the diffuser region, and moving the absorbed heat via the coolant to the heat exchanger.

18. The method of claim 15, further comprising passing a coolant through a fourth passage in thermal contact with an volute region of the compressor, absorbing heat from the volute region, and moving the absorbed heat via the coolant to the heat exchanger.

19. The method of claim 15, further comprising;

passing the coolant through a second passage in thermal contact with an impeller region of the compressor, absorbing heat from the impeller region;

passing the coolant through a third passage in thermal contact with an diffuser region of the compressor, absorbing heat from the diffuser region;

passing the coolant through a fourth passage in thermal contact with a volute region of the compressor, absorbing heat from the volute region; and moving the absorbed heat via the coolant to the heat exchanger.

20. The method of claim 15, wherein the passing the coolant through the first passage in thermal contact with the inlet passage interior surface includes directing the coolant fluid from a cooling fluid conduit coupled with a coolant jacket configured to cool a bearing supporting a shaft disposed for rotation with a turbine positioned within the compressor.

* * * * *